(12) United States Patent
Valgushev et al.

(10) Patent No.: US 11,128,645 B2
(45) Date of Patent: Sep. 21, 2021

(54) METHOD AND SYSTEM FOR DETECTING FRAUDULENT ACCESS TO WEB RESOURCE

(71) Applicant: YANDEX EUROPE AG, Lucerne (CH)

(72) Inventors: Danil Nikolaevich Valgushev, Moscow (RU); Georgy Eduardovich Pavlov, Cheboksary (RU); Artur Azamatovich Malikov, Moscow Region (RU); Vladimir Viktorovich Ashikhmin, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 16/869,878

(22) Filed: May 8, 2020

(65) Prior Publication Data

US 2021/0075802 A1 Mar. 11, 2021

(30) Foreign Application Priority Data

Sep. 9, 2019 (RU) .......................... RU2019128268

(51) Int. Cl.
*H04L 29/06* (2006.01)
*H04L 29/08* (2006.01)
*G06Q 20/40* (2012.01)

(52) U.S. Cl.
CPC ..... *H04L 63/1416* (2013.01); *G06Q 20/4016* (2013.01); *H04L 63/0435* (2013.01);
(Continued)

(58) Field of Classification Search
CPC ..... H04L 67/02; H04L 63/08; H04L 63/1466; H04L 63/0876; H04L 67/146; H04L 67/14; G06Q 20/4016; G06Q 20/4014
See application file for complete search history.

(56) References Cited

U.S. PATENT DOCUMENTS 7,519,562 B1 4/2009 Vander et al.
7,610,276 B2 10/2009 Yomtobian
(Continued)

FOREIGN PATENT DOCUMENTS

CN 103853744 A 6/2014
RU 2446459 C1 3/2012

OTHER PUBLICATIONS

Notice of Allowance dated Apr. 2, 2021 received in respect of a related U.S. Appl. No. 16/868,363.
(Continued)

*Primary Examiner* — Chirag R Patel
(74) *Attorney, Agent, or Firm* — BCF LLP

(57) ABSTRACT

A method and system for detecting fraudulent access to a web resource is disclosed. The web resource is hosted by a server and the method being executable by the server. The method comprises: receiving, by the server, a first request to access the web resource by a first electronic device, the first request including a first cookie; converting, by the server, the first cookie into a second cookie; transmitting, by the server, the second cookie to the first electronic device for storing; receiving, by the server, a second request to access the web resource by a second electronic device, the second request including a third cookie; and determining, by the server, the second request to be a fraudulent request, the determining based on an analysis of the third cookie and the first cookie.

16 Claims, 5 Drawing Sheets

(52) U.S. Cl.
CPC .......... *H04L 63/1466* (2013.01); *H04L 67/02* (2013.01); *H04L 67/142* (2013.01)

(56) References Cited

U.S. PATENT DOCUMENTS

| | | | |
|---|---|---|---|
| 7,779,103 | B1 | 8/2010 | Fikes et al. |
| 7,827,054 | B2 | 11/2010 | Campbell et al. |
| 7,877,800 | B1 | 1/2011 | Satish et al. |
| 8,578,462 | B2 * | 11/2013 | Petrovic ............... H04L 9/3297 726/9 |
| 8,661,299 | B1 | 2/2014 | Ip |
| 8,818,906 | B1 | 8/2014 | Szwalbenest |
| 8,966,631 | B2 | 2/2015 | El-Moussa et al. |
| 9,047,628 | B2 | 6/2015 | Mislove et al. |
| 9,092,510 | B1 | 7/2015 | Stets et al. |
| 9,183,387 | B1 | 11/2015 | Altman et al. |
| 9,241,010 | B1 | 1/2016 | Bennett et al. |
| 9,349,134 | B1 | 5/2016 | Adams et al. |
| 9,479,516 | B2 | 10/2016 | Mote et al. |
| 9,652,354 | B2 | 5/2017 | Filimonov et al. |
| 9,672,242 | B2 | 6/2017 | Jung et al. |
| 9,846,896 | B2 | 12/2017 | Shah et al. |
| 9,866,566 | B2 | 1/2018 | Dulkin et al. |
| 9,870,596 | B2 | 1/2018 | Babinowich et al. |
| 10,009,358 | B1 | 6/2018 | Xie et al. |
| 10,084,816 | B2 | 9/2018 | Zhang et al. |
| 10,089,660 | B2 | 10/2018 | Luan et al. |
| 10,218,733 | B1 | 2/2019 | Amidon et al. |
| 2005/0132222 | A1 | 6/2005 | Petrovic |
| 2005/0262026 | A1 | 11/2005 | Watkins et al. |
| 2006/0185021 | A1 | 8/2006 | Dujari et al. |
| 2008/0162475 | A1 | 7/2008 | Meggs et al. |
| 2008/0172271 | A1 | 7/2008 | Wee et al. |
| 2008/0301090 | A1 | 12/2008 | Sadagopan et al. |
| 2008/0301811 | A1 | 12/2008 | Jung |
| 2009/0049547 | A1 | 2/2009 | Fan |
| 2009/0083184 | A1 | 3/2009 | Eisen et al. |
| 2011/0055104 | A1 | 3/2011 | Sun et al. |
| 2011/0208714 | A1 | 8/2011 | Soukal et al. |
| 2012/0233692 | A1 | 9/2012 | Oh et al. |
| 2013/0332468 | A1 | 12/2013 | Hardas et al. |
| 2014/0114877 | A1 | 4/2014 | Montano |
| 2014/0214570 | A1 | 7/2014 | Smolev et al. |
| 2015/0205862 | A1 | 7/2015 | Campagne et al. |
| 2015/0264073 | A1 | 9/2015 | Tavakoli et al. |
| 2015/0326674 | A1 | 11/2015 | Kruglick et al. |
| 2015/0341383 | A1 * | 11/2015 | Reddy ................. H04L 63/1466 726/22 |
| 2016/0065600 | A1 | 3/2016 | Lee et al. |
| 2016/0196566 | A1 | 7/2016 | Murali et al. |
| 2016/0259742 | A1 | 9/2016 | Faulkner et al. |
| 2016/0321711 | A1 | 11/2016 | Wouhaybi et al. |
| 2017/0220971 | A1 | 8/2017 | Giammaria et al. |
| 2017/0221111 | A1 | 8/2017 | Salehi et al. |
| 2017/0230229 | A1 | 8/2017 | Sasturkar et al. |
| 2017/0272458 | A1 | 9/2017 | Muddu et al. |
| 2018/0048658 | A1 | 2/2018 | Hittel et al. |
| 2018/0196684 | A1 | 7/2018 | Pengfei et al. |
| 2018/0218295 | A1 | 8/2018 | Hasija et al. |
| 2018/0278647 | A1 | 9/2018 | Gabaev et al. |
| 2018/0357683 | A1 | 12/2018 | Pickover et al. |
| 2019/0034986 | A1 | 1/2019 | Robinson et al. |
| 2019/0379700 | A1 | 12/2019 | Canzanese et al. |
| 2020/0012981 | A1 | 1/2020 | Davison et al. |
| 2020/0311309 | A1 * | 10/2020 | Dawer ................. G06F 21/6245 |
| 2020/0342006 | A1 | 10/2020 | Rossi et al. |

OTHER PUBLICATIONS

"Search Engine Click Spam Detection Based on Bipartite Graph Propagation" http://www.thuir.cn/group/~YQLiu/publications/wsdm2014.pdf, published in WSDM '14 Proceedings of the 7th ACM international conference on Web search and data mining on Feb. 24, 2014, retrieved on Oct. 9, 2019.

Walgampaya "Cracking the Smart ClickBot", Conference: 13th IEEE International Symposium on Web Systems Evolution, WSE 2011, Williamsburg, VA, USA, Sep. 30, 2011, DOI: 10.1109/WSE.2011.6081830 , retrieved on Oct. 9, 2019.

Yafeng "Positive Unlabeled Learning for Deceptive Reviews Detection", Wuhan University, published in Proceedings of the 2014 Conference on Empirical Methods in Natural Language Processing (EMNLP), retrieved on Oct. 9, 2019.

Russian Search report dated Jul. 5, 2021 in respect of the Russian Patent Application RU 2019128268.

Notice of Allowance dated Jun. 24, 2021 received in respect of a related U.S. Appl. No. 16/869,282.

* cited by examiner

METHOD AND SYSTEM FOR DETECTING FRAUDULENT ACCESS TO WEB RESOURCE

CROSS-REFERENCE

The present application claims priority to Russian Patent Application No. 2019128268, entitled "Method and System for Detecting Fraudulent Access to Web Resource", filed Sep. 9, 2019, the entirety of which is incorporated herein by reference.

FIELD

The present technology generally relates to systems and methods for detecting fraudulent access, and, in particular, to methods and systems for detecting fraudulent access to a web resource.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment-related information. Users use a variety of client devices (desktop, laptop, notebook, smartphone, tablets and the like) to have access to rich content (like images, audio, video, animation, and other multimedia content from such networks).

The use of cookies to track visitors and provide enhanced experiences by the web resources is generally known. A cookie refers to a small text file of information sent by a web server to a web browser that the browser software is expected to save and send back to the server whenever the browser makes additional requests from the server.

Generally speaking, most web resources use cookies as the only identifiers for user devices. Needless to say, it is possible for an attacker to impersonate a user's request by stealing a full set of the victim's cookie. From the web service's point of view, the attacker has the same identifier as the victim's, and thus the request is performed on behalf of the victim.

United States Patent Application Publication No. 2005/262026 A1 published on Nov. 24, 2005 to Daniel Watkins, and titled "Authorisation System", discloses systems and methods for securely authorising an on-line transaction, e.g. involving a micro-payment between a customer browser and merchant server without the need for special software installed on the customer computer or a SSL connection to the merchant server. The authorisation method involves a double redirection instruction: the initial transaction request is redirected via the customer web browser to a service provider arranged to authenticate the customer, from where the authenticated instruction is further redirected via the customer web browser to a merchant site to complete the transaction. Information identifying the merchant, merchandise, etc. is included in the redirection instruction, and may be encrypted or encoded e.g. using a hash function to prevent tampering. To authorise an authenticated instruction, a cookie containing transaction identification data may be returned to the merchant web server along with the authenticated instruction. Alternatively, the service provider may set a time limit after which the authenticated instruction will no longer be valid.

United States Patent Application Publication No. 2009/0083184 A1 published on Mar. 26, 2009 to Ori Eisen, and titled "Methods and Apparatus For Detecting Fraud With Time Based Computer Tags", discloses systems and methods for creating and analyzing computer tag information for the prevention or detection of potential fraud. Computers and other devices accessing the Web carry device tags with date and time information describing when they were issued by a security tag server. A server time stamp may be inserted into time based computer tags such as a cookies indicating when they were created. Such time stamp information can be encrypted and analyzed during future attempts to access a secure network such as a customer attempting to log into an online banking account. When the time stamp information from the tag is compared to other selected information about the user, device and/or account, including but not limited to last account log-in date/time or account creation date, the invention may be used to detect suspicious activity.

SUMMARY

Non-limiting embodiments of the present technology have been developed based on developer's appreciation of at least one technical problem associated with the prior art solutions.

In accordance with a first broad aspect of the present technology, there is provided a method of detecting fraudulent access to a web resource hosted by a server. The method is executable by the server. The method comprises: receiving, by the server, a first request to access the web resource by a first electronic device, the first request including a first cookie; converting, by the server, the first cookie into a second cookie; transmitting, by the server, the second cookie to the first electronic device for storing; receiving, by the server, a second request to access the web resource by a second electronic device, the second request including a third cookie; and determining, by the server, the second request to be a fraudulent request, the determining based on an analysis of the third cookie and the first cookie.

In some non-limiting embodiments of the present technology, the first cookie is a first encrypted cookie; the third cookie is a third encrypted cookie; and converting the first cookie into the second cookie comprises re-encrypting the first encrypted cookie into a second encrypted cookie.

In some non-limiting embodiments of the present technology, the first encrypted cookie includes a first user device ID associated with the first electronic device and a first time stamp indicative of a creation time of the first encrypted cookie: the second encrypted cookie includes the first user device ID and a second time stamp indicative of the creation time of the second encrypted cookie; the third encrypted cookie includes at least a second user device ID.

In some non-limiting embodiments of the present technology, the server is coupled to a database, and the method further comprises: storing, by the server, an indication of the re-encryption of the first encrypted cookie to the second encrypted cookie within the database.

In some non-limiting embodiments of the present technology, the determining the second request to be a fraudulent request comprises: accessing the database to determine the second user device ID to be the same as the first user device ID.

In some non-limiting embodiments of the present technology, the first electronic device is different from the second electronic device.

In some non-limiting embodiments of the present technology, the first electronic device is the second electronic device.

In some non-limiting embodiments of the present technology, the method further comprises: in response to receiving the first request, determining a time of creation of the first encrypted cookie; in response to the time of creation being indicative of an age of the first encrypted cookie being above a predetermined threshold, re-encrypting the first encrypted cookie into the second encrypted cookie In some non-limiting embodiments of the present technology, the server is configured to store a first encryption key and a second encryption key, and wherein the method further comprises: prior to receiving the first request, receiving a third request by the first electronic device; generating the first encrypted cookie with the first encryption key; transmitting the first encrypted cookie to the first electronic device for storage; and wherein: re-encrypting by the server comprises: decrypting the first encrypted cookie using the first encryption key; re-encrypting the decrypted first encrypted cookie with the second encrypted key, the second encrypted cookie being different from the first encrypted cookie.

In some non-limiting embodiments of the present technology, in response to determining the second request to be a fraudulent request, performing a restrictive action to the second request.

In some non-limiting embodiments of the present technology, the restrictive action is one of: denying the second request; granting limited access to the web resource.

In accordance with another broad aspect of the present technology, there is provided a system for detecting a fraudulent access to a web resource, the web resource being hosted by a server. The server comprises a processor configured to: receive a first request to access the web resource by a first electronic device, the first request including a first cookie; convert the first cookie into a second cookie; transmit the second cookie to the first electronic device for storing; receive a second request to access the web resource by a second electronic device, the second request including a third cookie; and determine the second request to be a fraudulent request, the determining based on an analysis of the third cookie and the first cookie.

In some non-limiting embodiments of the present technology, the first cookie is a first encrypted cookie; the third cookie a third encrypted cookie; and to convert the first cookie into the second cookie, the processor is configured to re-encrypt the first encrypted cookie into a second encrypted cookie.

In some non-limiting embodiments of the present technology, the first encrypted cookie includes a first user device ID associated with the first electronic device and a first time stamp indicative of a creation time of the first encrypted cookie: the second encrypted cookie includes the first user device ID and a second time stamp indicative of the creation time of the second encrypted cookie; the third encrypted cookie includes at least a second user device ID.

In some non-limiting embodiments of the present technology, the server is coupled to a database, and the processor is further configured to: store an indication of the re-encryption of the first encrypted cookie to the second encrypted cookie within the database.

In some non-limiting embodiments of the present technology, to determine the second request to be a fraudulent request, the processor is configured to: access the database to determine the second user device ID to be the same as the first user device ID.

In some non-limiting embodiments of the present technology, the first electronic device is different from the second electronic device.

In some non-limiting embodiments of the present technology, the first electronic device is the second electronic device.

In some non-limiting embodiments of the present technology, the processor is further configured to: in response to receiving the first request, determine a time of creation of the first encrypted cookie; in response to the time of creation being indicative of an age of the first encrypted cookie being above a predetermined threshold, re-encrypt the first encrypted cookie into the second encrypted cookie.

In some non-limiting embodiments of the present technology, the processor is configured to store a first encryption key and a second encryption key, and wherein the processor is further configure to: prior to receiving the first request, receive a third request by the first electronic device; generate the first encrypted cookie with the first encryption key; transmit the first encrypted cookie to the first electronic device for storage; and wherein: to re-encrypt by the server, the processor is configured to: decrypt the first encrypted cookie using the first encryption key; re-encrypt the decrypted first encrypted cookie with the second encrypted key, the second encrypted cookie being different from the first encrypted cookie.

In the context of the present specification, a "server" is a computer program that is running on appropriate hardware and is capable of receiving requests (e.g. from electronic devices) over the network, and carrying out those requests, or causing those requests to be carried out. The hardware may be one physical computer or one physical computer system, but neither is required to be the case with respect to the present technology. In the present context, the use of the expression a "at least one server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, unless provided expressly otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
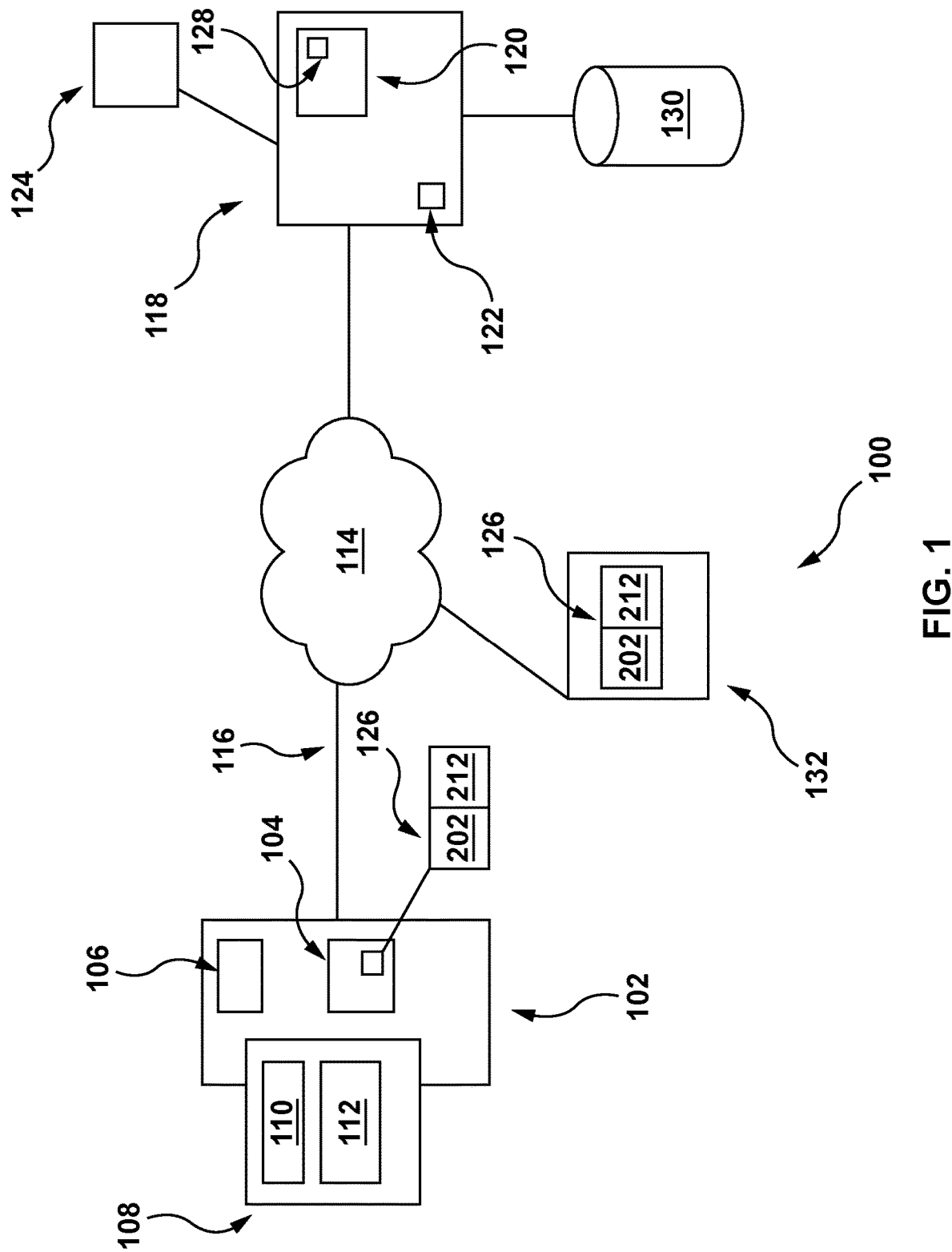
FIG. 1 depicts a schematic diagram of a system implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises a first electronic device 102. The first electronic device 102 is typically associated with a user (not depicted) and, as such, can sometimes be referred to as a "client device". It should be noted that the fact that the first electronic device 102 is associated with the user does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The first electronic device 102 comprises a permanent storage 104. The permanent storage 104 may encompass one or more storage media and generally provides a place to store computer-executable instructions executable by a processor 106. By way of example, the permanent storage 104 may be implemented as a computer-readable storage medium including Read-Only Memory (ROM), hard disk drives (HDDs), solid-state drives (SSDs), and flash-memory cards.

The first electronic device 102 comprises hardware and/or software and/or firmware (or a combination thereof), as is known in the art to execute a browser application 108. Generally speaking, the purpose of the browser application 108 is to enable the user (not depicted) to access one or more web resources. The manner in which the browser application 108 is implemented is known in the art and will not be described herein. Suffice it to say that the browser application 108 may be one of Google™ Chrome™ browser, Yandex.Browser™ browser, or other commercial or proprietary browsers.

Irrespective of how the browser application 108 is implemented, the browser application 108, typically, has a command interface 110 and a browsing interface 112. Generally speaking, the user (not depicted) can access a web resource via a communication network by two principle means. The given user can access a particular web resource directly, either by typing an address of the web resource (typically an URL or Universal Resource Locator, such as www.example.com) into the command interface 110 or by clicking a link in an e-mail or in another web resource (which action will in a sense "copy and paste" the URL associated with the link into the command interface 110).

Alternatively, the given user may conduct a search using a search engine service (not depicted) to locate a resource of interest based on the user's search intent. The latter is particularly suitable in those circumstances, where the given user knows a topic of interest, but does not know the URL of the web resource she is interested in. The search engine typically returns a Search Engine Result Page (SERP) containing links to one or more web resources that are responsive to the user query. Again, upon the user clicking one or more links provided within the SERP, the user can open the required web resource.

The first electronic device 102 comprises a communication interface (not depicted) for two-way communication with a communication network 114 via a communication link 116. In some non-limiting embodiments of the present technology, the communication network 114 can be implemented as the Internet. In other embodiments of the present technology, the communication network 114 can be implemented differently, such as any wide-area communication network, local area communications network, a private communications network and the like.

How the communication link 116 is implemented is not particularly limited and depends on how the first electronic device 102 is implemented. Merely as an example and not as a limitation, in those embodiments of the present technology where the first electronic device 102 is implemented as a wireless communication device (such as a smart phone), the communication link 116 can be implemented as a wireless communication link (such as, but not limited to, a 3G communications network link, a 4G communications network link, a Wireless Fidelity, or WiFi®, for short, Bluetooth®, or the like) or wired (such as an Ethernet based connection).

It should be expressly understood that implementations for the first electronic device 102, the communication link 116 and the communication network 114 are provided for illustration purposes only. As such, those skilled in the art will easily appreciate other specific implementational details for the first electronic device 102, the communication link 116 and the communication network 114. As such, by no means the examples provided hereinabove are meant to limit the scope of the present technology.

The system 100 further includes a server 118 coupled to the communication network 114. The server 118 can be implemented as a conventional computer server. In an example of an embodiment of the present technology, the server 118 can be implemented as a Dell™ PowerEdge™ Server running the Microsoft™ Windows Server™ operating system. Needless to say, the server 118 can be implemented in any other suitable hardware and/or software and/or firmware or a combination thereof. In the depicted non-limiting embodiment of the present technology, the server 118 is a single server. In alternative non-limiting embodiments of the present technology, the functionality of the server 118 may be distributed and may be implemented via multiple servers.

The implementation of the server 118 is well known. However, briefly speaking, the server 118 comprises a communication interface (not depicted) structured and configured to communicate with various entities (such as the first electronic device 102 and other devices potentially coupled to the communication network 114). Similar to the first electronic device 102, the server 118 comprises a server memory 120 which comprises one or more storage media and generally provides a place to store computer-executable program instructions executable by a server processor 122. By way of example, the server memory 120 may be implemented as tangible computer-readable storage medium including Read-Only Memory (ROM) and/or Random-Access Memory (RAM). The server memory 120 may also include one or more fixed storage devices in the form of, by way of example, hard disk drives (HDDs), solid-state drives (SSDs), and flash-memory cards.

In some embodiments, the server 118 can be operated by the same entity that has provided the afore-described browser application 108. For example, if the browser application 108 is a Yandex.Browser™ browser, the server 118 can be operated by Yandex LLC of Lev Tolstoy Street, No. 16, Moscow, 119021, Russia. In alternative embodiments, the server 118 can be operated by an entity different from the one who has provided the afore-mentioned browser application 108.

In some embodiments of the present technology, and generally speaking, the server 118 functions as a repository for a web resource 124. In the context of the present specification, the term "web resource" refers to any network resource (such as a web page, web site or a web service), which its content is visually presentable by the first electronic device 102 to the user, via the browser application 108, and associated with a particular web address (such as a URL).

The web resource 124 is accessible by the first electronic device 102 via the communication network 114, for example, by means of the user typing in the URL in the browser application 108 or executing a web search using the search engine (not depicted). Although in the depicted non-limiting embodiment of the present technology, the server 118 hosts only the web resource 124, it is not limited as such and, may host more than a single web resource.

In some non-limiting embodiments of the present technology, and generally speaking, the server 118 is configured to generate and transmit a cookie to the electronic devices accessing the web resource 124. How the cookie is generated is well known in the art and will not be described in detail herein. Suffice it to say that in response to a request by an electronic device, the server 118 is configured to generate and transmit a cookie to the electronic device if the request itself does not include a cookie.

For example, the server 118 is configured to execute an authentication application 128. In some non-limiting embodiments of the present technology, the authentication application 128 is configured to generate a cookie 126 in response to an access request by the first electronic device 102 to the web resource 124 and a lack of a cookie within the access request.

The cookie 126 is an identifier assigned by the authentication application 128. In some non-limiting embodiments of the present technology, the cookie is made up of a user identifier (described in detail below) and a time stamp corresponding to a time of creation of the cookie 126.

Generally speaking, the cookie 126 is stored within the first electronic device 102 and can be temporary, meaning that it is stored within the first electronic device 102 for the duration of a browsing session. Alternatively, and in some non-limiting embodiments of the present technology, the cookie 126 is semi-permanent, meaning that the cookie 126 remains stored within the first electronic device 102 after the user has exited the web resource 124, and is used again by the server 118 in a subsequent access. The cookie 126 can be stored within the first electronic device 102 until deleted by the user, for example.

In some embodiments of the present technology, the cookie 126 is encrypted using an encryption key (not illustrated). How the encryption key is implemented is not limited. For example, the encryption key may be based or be a variant of an algorithm based on the Advanced Encryption Standard (AES) 128 Electronic Code Book (ECB) and the like.

In some non-limiting embodiments of the present technology, and generally speaking, the cookie 126 is transmitted by the browser application 108 to the server 118 every time a new web page from the web resource 124 is requested.

In some non-limiting embodiments of the present embodiment, the cookie 126 is a dynamic cookie. In the context of the present specification the term "dynamic cookie" may refer to a cookie that changes over time.

For example, recalling that the cookie 126 is made up of a time stamp, in some non-limiting embodiments of the present technology, the authentication application 128 is configured to change the time stamp of the cookie 126 to reflect the time and date of each access request. In other words, each time the first electronic device 102 requests access to the web resource 124, the cookie 126 is modified by the authentication application 128 to modify the time stamp, and transmit the modified cookie 126 to the first electronic device 102 for storage. In other words, recalling that the cookie 126 is made up of, at least, the user identifier and the time stamp, the user identifier remains the same but the time stamp will dynamically change based on the time of the last access to the web resource 124.

In some non-limiting embodiments of the present technology, the authentication application 128 is configured to change the time stamp of the cookie 126 in response to one or more trigger events. For example, the authentication application 128 may be configured to update the time stamp of the cookie 126 every access after a predetermined period of time (for example, every week, months, etc.).

In another example, the authentication application 128 may be configured to update the time stamp of the cookie 126 in response to the presence of another encryption key (such as a new encryption key, not depicted). In such a situation, the authentication application 128 is configured to decrypt the cookie 126 using the encryption key, and the re-encrypt the cookie 126 (with its new time stamp) using the new encryption key. For example, the authentication application 128 may be configured to use a new re-encryption key on a periodical basis (such as every week, every two weeks, and the like).

In order to track the different time stamps that have been associated with each cookie, the server 118 is, in some non-limiting embodiments of the present technology, coupled to a database 130

Figure 2:
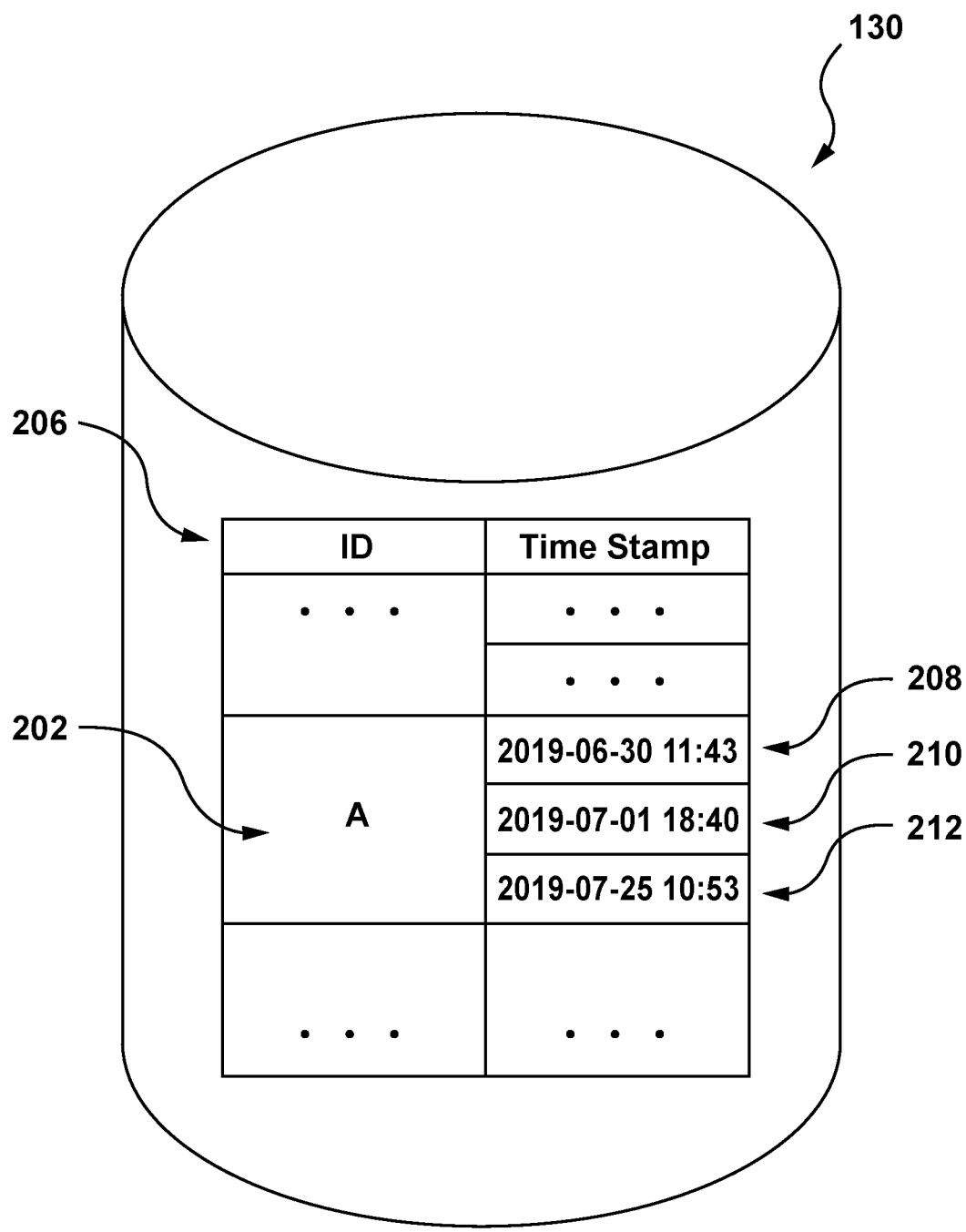
FIG. 2 depicts a schematic illustration of a database of the system.

With reference to FIG. 2, there is depicted a schematic illustration of the database 130.

Let us assume, for the purpose of the explanation, that the cookie 126 is associated with the user identifier 202. The list 206 then comprises the time stamps associated with the user identifier 202.

In the illustrated example, the user identifier 202 is associated with three time stamps (namely a first time stamp 208, a second time stamp 210 and a third time stamp 212). The three time stamps are organized in a chronological manner, such that the first time stamp 208 is associated with a first visit by the first electronic device 102, the second time stamp 210 is associated with a subsequent visit by the first electronic device 102, and the third time stamp 212 is the latest visit, or, the last time the cookie 126 has been encrypted.

Needless to say, it is also contemplated that instead of being associated with a time of visit, the time stamps be indicative of a time at which the cookie 126 has been encrypted and re-encrypted.

In some non-limiting embodiments of the present technology, the server 118 is configured to track information associated with the browser application 108. For example, the server 118 may store information about the browser application 108 and the operating systems used, duration of the visit(s), the web pages visited within the web resource 124, which links, buttons, or other items were clicked within the web resource 124, and what was typed into text fields within the web resource 124 (for example, published comments).

In some non-limiting embodiments of the present technology, the authentication application 128 is configured to assign a user score to each users based on the tracked information. For example, the user score is a score that is indicative of a likelihood of the given user being one of a computer application (such as a bot) and/or a human spammer. Needless to say, it is also contemplated that instead of being indicative of a likelihood of the given user being one of a computer application and/or a human spammer, the score be indicative of the given user being a trusted user.

How the user score is determined is not limited. Recalling that the server 118 is configured to store information associated with the browser application 108, the authentication application 128 may be configured to determine the user score based on an empirical approach (by gathering actual sample marked as non-spamming human like browsing pattern on the web resource 124) or heuristic approach (by defining what a non-spamming human based browsing of the web resource 124 be). Just as an illustration, the authentication application 128 may be configured to assign a lower user score (i.e. indicative of a higher likelihood of the user being a bot or a spammer) if the duration of the visit is excessively long (for example, 6 hours) compared to the average human user (such as 30 minutes).

In another example, the authentication application 128 may be configured to assign a lower user score if the number of web page visited within the web resource 124 is excessive (such as 100 web pages) compared to the average human user (such as 10 web pages).

In yet another example, the authentication application 128 may be configured to assign a lower user score if the content of the text fields inputted by the user contains profanity, incomprehensible text, and the like.

Although in the above example, the user score is determined using only the activity of the user vis-a-vis the web resource 124 it is not limited as such. In some non-limiting embodiments of the present technology, the user score may be determined using browsing/navigational activities of the browser application 108 prior to accessing the web resource 124 by using the technology described in a co-owned U.S. Patent Application entitled "METHOD AND SYSTEM FOR DETECTION POTENTIAL SPAM ACTIVITY DURING ACCOUNT REGISTRATION" and bearing application Ser. No. 15/893,824, filed on Feb. 12, 2018 by the same applicant, and incorporated herein by reference in its entirety.

In some non-limiting embodiments of the present technology, if the user score is below a predetermined threshold, the authentication application 128 is configured to execute a restrictive action against the browsing application associated with said user score. For example, the restrictive action may correspond to one of: (i) refusing the request by the electronic device to access the web resource 124; (ii) limit the number of web pages that may be requested by the electronic device on the web resource 124; (iii) disable the comment posting function such that the associated user cannot post (or is limited in the number of posts) within the web resource 124.

In some non-limiting embodiments of the present technology, the user score associated with each cookie is stored within the database 130.

Returning to FIG. 1, let us assume that the cookie 126 stored within the first electronic device 102 comprises the user identifier 202 and the third time stamp 212.

Although the cookie 126 is described as made up of the user identifier 202 and the latest time stamp 212, it is not limited as such. In some non-limiting embodiments of the present technology, the cookie 126 may be made up of the user identifier 202 and a chain of time stamps. In other words, the cookie 126 is made up of the user identifier 202, the first time stamp 208, the second time stamp 210 and the third time stamp 212 to illustrate chronologically the visits and/or re-encryption of the cookie 126. In these embodiments, the database 130 does not need to store the time stamps. i.e. the first time stamp 208, the second time stamp 210 and the third time stamp 212.

In yet further non-limiting embodiments and broadly speaking, whether stored locally by the first electronic device 102 or centrally by the database 130, the stored time stamps may be either a series of time stamps (i.e. the first time stamp 208, the second time stamp 210 and the third time stamp 212) or only the most recent times tamp (in this case the third time stamp 212).

The system 100 further comprises a second electronic device 132 coupled to the communication network 114. How the second electronic device 132 is implemented is not limited, and may for example be implemented similar to the first electronic device 102.

In some non-limiting embodiments of the present technology, the second electronic device 132 is associated with a user that is cookie thief. In other words, the user associated with the second electronic device 132 is interested in "impersonating" another user by using the cookie associated with other electronic device(s) when accessing a web resource.

The reason why the second electronic device 132 is interested in impersonating another device's cookie is not limited. For example, it may be that the second electronic device 132 is associated with a user score below the threshold, and consequently desire to steal the cookie 126 which is associated with a user score above a threshold. Indeed, as noted above, many web resources (such as the web resource 124) use cookies as identifiers for filtering out users that are associated with a user score below the threshold. By stealing someone else's cookie (such as the cookie 126), the second electronic device 132 also steals the history associated with the first electronic device 102, and therefore can circumvent the filter.

How a cookie is stolen by the second electronic device 132 is beyond the scope of the present technology and therefore will not be discussed herein in detail. Suffice it to say that known methods for cookie theft include, for example, network eavesdropping, cross-site scripting (also known as "XSS"), and the like.

In the present example, let us assume that the second electronic device 132 has stolen the cookie 126 stored by the first electronic device 102. As such, second electronic device 132 comprises a cookie with the user identifier 202 and the third time stamp 212.

Although the description of the system 100 has been made with reference to various hardware entities (such as the database 130, the server 118, the first electronic device 102 and the second electronic device 132) depicted separately, it should be understood that this is done for ease of understanding. It is contemplated that the various functions executed by these various entities be executed by a single entity or be distributed among different entities.

Authentication Application 128

As it would be appreciated, as a result of the "copying" or "stealing" of the cookie 126 by the second electronic device 132 from the first electronic device 102, the system 100 now has two electronic devices having the same cookie 126.

In other words, from the perspective of the server 118, both the first electronic device 102 and the second electronic device 132 corresponds to a single electronic device (as they have the same user identifier 202).

Needless to say, this is highly problematic since the second electronic device 132 may impersonate the first electronic device 102 when accessing the web resource 124 to engage in spamming, or even unlawful activities on the web resource 124.

Figure 3:
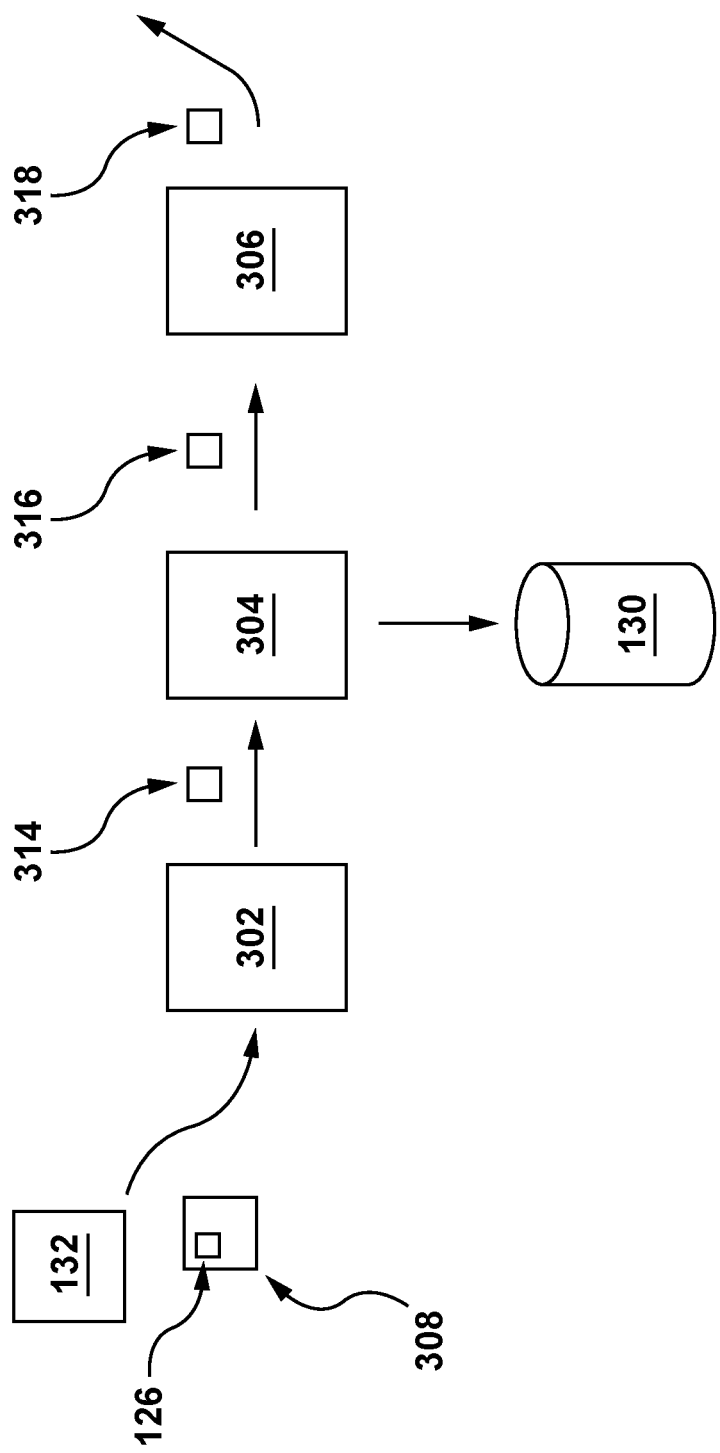
FIG. 3 depicts a schematic diagram of a process for detecting fraudulent access to a web resource.

With reference to FIG. 3, there is depicted a schematic diagram of a process for determining fraudulent access to the web resource 124. The process for determining the fraudulent access is executed by the authentication application 128 (see FIG. 1) implemented in accordance with a non-limiting embodiment of the present technology. The authentication application 128 executes (or otherwise has access to): a receiving routine 302, a determination routine 304 and an output routine 306.

In the context of the present specification, the term "routine" refers to a subset of the computer executable program instructions of the authentication application 128 that is executable by the server processor 122 (the receiving routine 302, the determination routine 304, and the output routine 306). For the avoidance of any doubt, it should be expressly understood that the receiving routine 302, the determination routine 304, and the output routine 306 are illustrated herein as separate entities for ease of explanation of the processes executed by the authentication application 128. It is contemplated that some or all of the receiving routine 302, the determination routine 304, and the output routine 306 may be implemented as one or more combined routines.

For ease of understanding the present technology, functionality of each of the receiving routine 302, the determination routine 304, and the output routine 306, as well as data and/or information processed or stored therein are described below.

Receiving Routine 302

The receiving routine 302 is configured to receive a data packet 308 from the second electronic device 132. The data packet 308 includes the cookie 126 stored within the second electronic device 132. How the data packet 308 is transmitted to the receiving routine 302 is not limited and may for example be in response to the second electronic device 132 requesting access to the web resource 124.

If the cookie 126 is encrypted, the receiving routine 302 is configured to decrypt the cookie 126 using the means described above to identify the user identifier 202 and the third time stamp 212.

The receiving routine 302 is then configured to transmit a data packet 314 to the determination routine 304. The data packet 314 comprises the user identifier 202 and the third time stamp 212.

Determination Routine 304

In response to receiving the data packet 314, the determination routine 304 is configured to execute the following functions.

Firstly, the determination routine 304 is configured to access the database 130 and determine whether the third time stamp 212 is the most up-to-date time stamp associated with the user identifier 202.

In other words, recalling that the cookie 126 transmitted by the second electronic device 132 is associated with the third time stamp 212 dated Jul. 25, 2019 10:53, the determination routine 304 is configured to access the database 130 and determine if any subsequent new time stamp has been associated with the user identifier 202.

Figure 4:
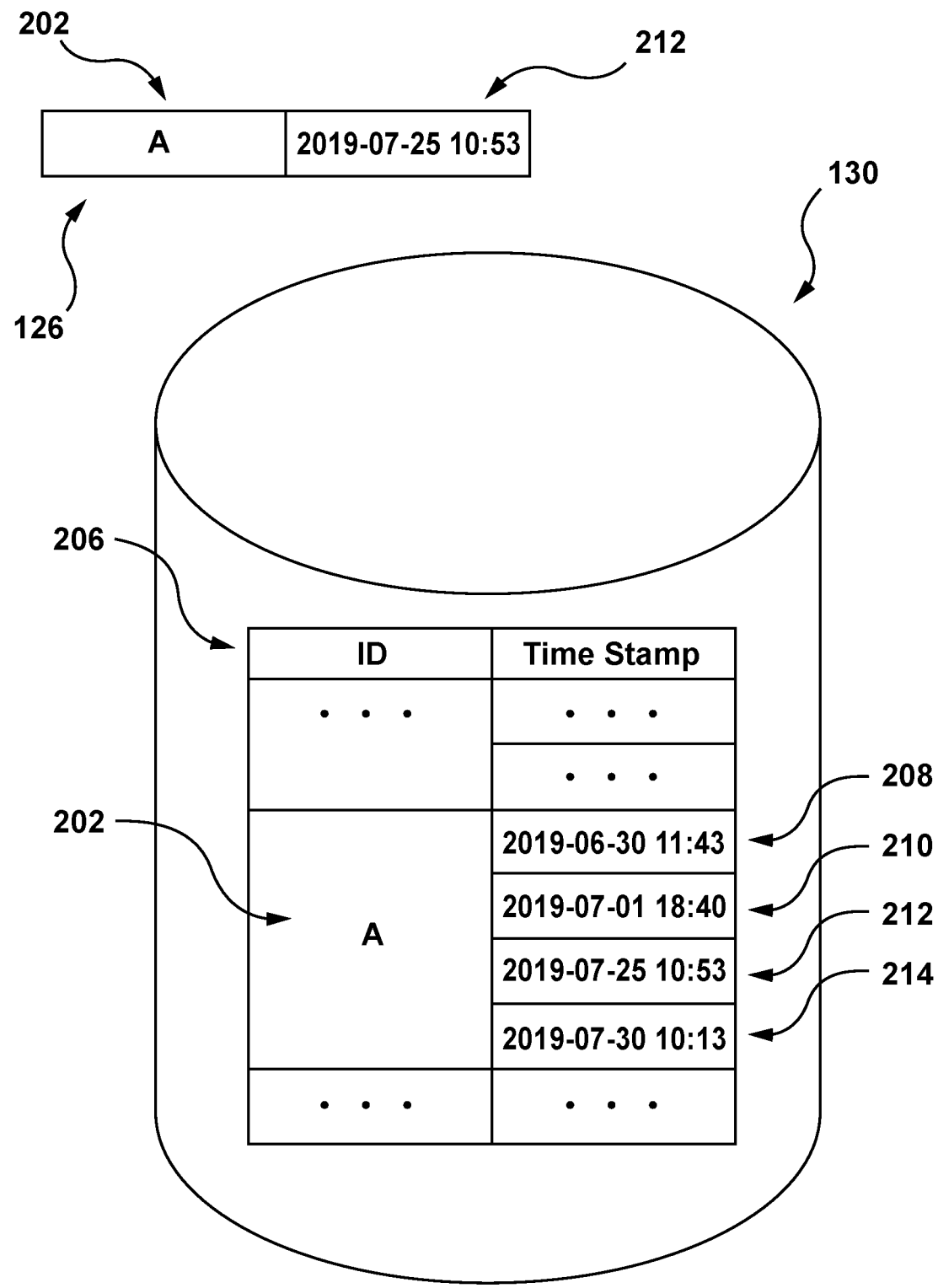
FIG. 4 depicts a schematic illustration of determining a most recent time stamp associated with a user identifier.
Figure 5:
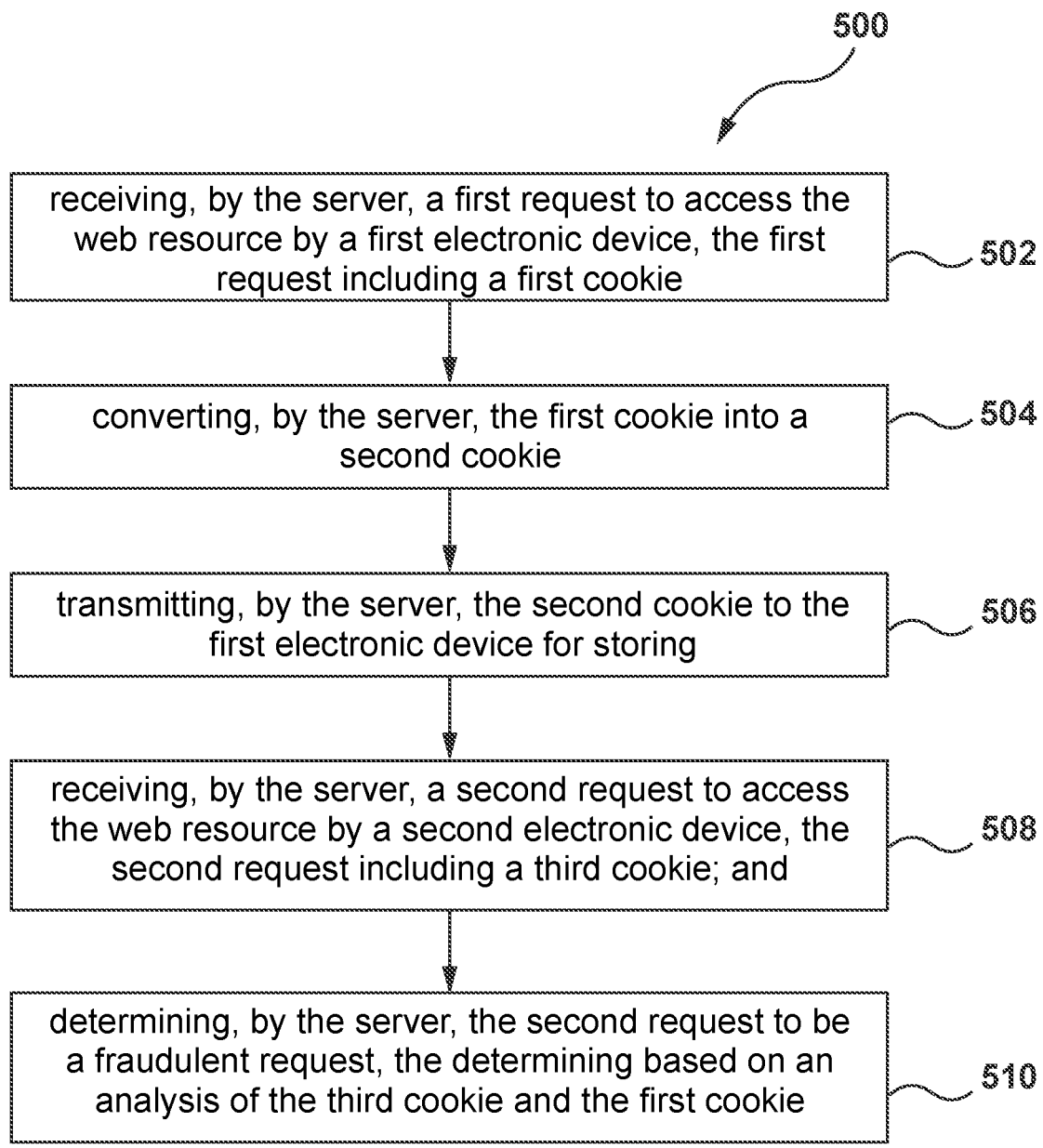
FIG. 5 depicts a block diagram of a flow chart of a method for detecting fraudulent access to a web resource.

With reference to FIG. 4, there is depicted a schematic illustration of determining if the user identifier 202 is associated with a most recent time stamp.

In the present example, the list 206 is indicative that the time stamp that is most recently associated with the user identifier 202 is no longer the third time stamp 212, but a fourth time stamp 214.

In other words, the first electronic device 102 has accessed the web resource on Jul. 30, 2019 at 10:13, where a new time stamp has been associated with the user identifier 202.

In response to determining that the third time stamp 212 is not the latest, most recent time stamp associated with the user identifier 202, the determination routine 304 is configured to determine that the second electronic device 132 has fraudulently acquired the cookie 126.

Returning to FIG. 3, the determination routine 304 is further configured to transmit a data packet 316 to the output routine 306. The data packet 316 comprises an indication that the request by the second electronic device 132 to access the web resource 124 is a fraudulent access.

Output Routine 306

In response to receiving the data packet 316, the output routine 306 is configured to execute the following functions.

As noted above, the request by the second electronic device 132 to access the web resource 124 is determined to be a fraudulent access. As such, the output routine 306 is configured to execute the restrictive action to the request (as described above).

In some non-limiting embodiments of the present technology, in addition to executing the restrictive action, the output routine 306 is further configured to generate and transmit a second cookie 318 to the second electronic device 132.

For example, the second cookie 318 comprises a user identifier that is different from the user identifier 202 (see FIG. 4), and is specific to the second electronic device 132. In other words, the second cookie 318 replaces the cookie 126 within the second electronic device 132.

In some non-limiting embodiments of the present technology, it is contemplated that not only the second cookie 318 is generated for the second electronic device 132, but the output routine 306 is further configured to generate and transmit a third cookie (not illustrated) to the first electronic device 102 in response to receiving a new request to access the web resource 124.

Indeed, this is based on the assumption that although cookie thieves usually keep the stolen cookie for a period of time before using it (and thus it will most likely that the first electronic device 102 has accessed the web resource 124 prior to the second electronic device 165's request), it is possible that this is not always the case. In other words, it may be that the second electronic device 132 has copied the cookie 126 and accessed the web resource 124 right after. Accordingly, when the first electronic device 102 subsequently requests access to the web resource 124, the third cookie (not illustrated) is generated and transmitted to the first electronic device 102 for storage, thereby replacing the cookie 126.

In other words, in some non-limiting embodiments of the present technology, if it is determined that the cookie 126 has been used by two different electronic devices, the server 118 is configured to generate and assign different cookies to each of the two different electronic devices (which would result in the cookie 126 becoming antiquated).

The various non-limiting embodiments of the present technology may allow the determining of a fraudulent access to a web resource.

Given the architecture and examples provided hereinabove, it is possible to execute a computer-implemented method of determining a fraudulent access to a web resource. With reference to FIG. 6, there is depicted a flow chart of a method 600, the method 600 being executable in accordance with non-limiting embodiments of the present technology. The method 600 can be executed by the server 118.

Step 602—receiving, by the server, a first request to access the web resource by a first electronic device, the first request including a first cookie.

The method 600 starts at step 602, where the first electronic device 102 transmits a request to access the web resource 124 to the server 118. The request comprises the cookie 126, which is made up of at least the user identifier 202 and the second time stamp 210.

Step 604: converting, by the server, the first cookie into a second cookie.

At step 604, the server 118 updates the cookie 126 which now comprises the third time stamp 212 and the user identifier 202.

Step 606: transmitting, by the server, the second cookie to the first electronic device for storing.

At step 606, the server 118 transmits the cookie 126, now comprising the user identifier 202 and the third time stamp 212 to the first electronic device 102 for storage.

Step 608: receiving, by the server, a second request to access the web resource by a second electronic device, the second request including a third cookie.

At step 608, the second electronic device 132 transmits the data packet 308 to the receiving routine 302. The data packet 308 comprises the cookie 126. The cookie 126 that is received from the second electronic device 132 comprises the user identifier 202 and the third time stamp 212.

Step 610: determining, by the server, the second request to be a fraudulent request, the determining based on an analysis of the third cookie and the first cookie.

At step 610, the determination routine 304 is configured to access the database 130 to determine if the third time stamp 212 is the most recent time stamp that is associated with the user identifier 202.

If, the third time stamp 212 is not the most recent time stamp that is associated with the user identifier 202, the determination routine 304 is then configured to determine that the request by the second electronic device 132 is a fraudulent request.

Modifications and improvements to the above-described implementations of the present technology may become apparent to those skilled in the art. The foregoing description is indented to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

We claim:

1. A method of detecting fraudulent access to a web resource, the web resource being hosted by a server, the method being executable by the server, the method comprising:
   receiving, by the server, a first request to access the web resource by a first electronic device, the first request including a first cookie, the first cookie being a first encrypted cookie;
   in response to receiving the first request, determining a time of creation of the first encrypted cookie;
   converting, by the server, the first cookie into a second cookie, the converting comprises re-encrypting the first encrypted cookie into a second encrypted cookie in response to the time of creation being indicative of an age of the first encrypted cookie being above a predetermined threshold;
   transmitting, by the server, the second cookie to the first electronic device for storing;
   receiving, by the server, a second request to access the web resource by a second electronic device, the second request including a third cookie, the third cookie being a third encrypted cookie; and
   determining, by the server, the second request to be a fraudulent request, the determining based on an analysis of the third cookie and the first cookie.

2. The method of claim 1, wherein:
   the first encrypted cookie includes a first user device ID associated with the first electronic device and a first time stamp indicative of a creation time of the first encrypted cookie;
   the second encrypted cookie includes the first user device ID and a second time stamp indicative of the creation time of the second encrypted cookie;
   the third encrypted cookie includes at least a second user device ID.

3. The method of claim 2, wherein the server is coupled to a database, and the method further comprises: storing, by the server, an indication of the re-encryption of the first encrypted cookie to the second encrypted cookie within the database.

4. The method of claim 3, wherein the determining the second request to be a fraudulent request comprises:
   accessing the database to determine the second user device ID to be the same as the first user device ID.

5. The method of claim 4, wherein the first electronic device is different from the second electronic device.

6. The method of claim 4, wherein the first electronic device is the second electronic device.

7. The method of claim 1, wherein the server is configured to store a first encryption key and a second encryption key, and wherein the method further comprises:
   prior to receiving the first request, receiving a third request by the first electronic device;
   generating the first encrypted cookie with the first encryption key;
   transmitting the first encrypted cookie to the first electronic device for storage; and wherein:
   re-encrypting by the server comprises:
     decrypting the first encrypted cookie using the first encryption key;
     re-encrypting the decrypted first encrypted cookie with the second encrypted key, the second encrypted cookie being different from the first encrypted cookie.

8. The method of claim 1, wherein the method further comprises:
   in response to determining the second request to be a fraudulent request, performing a restrictive action to the second request.

9. The method of claim 8, wherein the restrictive action is one of:
   denying the second request;
   granting limited access to the web resource.

10. A system for detecting a fraudulent access to a web resource, the web resource being hosted by a server, the server comprising a processor configured to:
    receive a first request to access the web resource by a first electronic device, the first request including a first cookie, the first cookie being a first encrypted cookie;
    in response to receiving the first request, the processor being configured to determine a time of creation of the first encrypted cookie;
    convert the first cookie into a second cookie, to convert, the processor being configured to re-encrypt the first encrypted cookie into a second encrypted cookie in response to the time of creation being indicative of an age of the first encrypted cookie being above a predetermined threshold;
    transmit the second cookie to the first electronic device for storing;
    receive a second request to access the web resource by a second electronic device, the second request including a third cookie, the third cookie being a third encrypted cookie; and
    determine the second request to be a fraudulent request, the determining based on an analysis of the third cookie and the first cookie.

11. The system of claim 10, wherein:
the first encrypted cookie includes a first user device ID associated with the first electronic device and a first time stamp indicative of a creation time of the first encrypted cookie:
the second encrypted cookie includes the first user device ID and a second time stamp indicative of the creation time of the second encrypted cookie;
the third encrypted cookie includes at least a second user device ID.

12. The system of claim 11, wherein the server is coupled to a database, and the processor is further configured to: store an indication of the re-encryption of the first encrypted cookie to the second encrypted cookie within the database.

13. The system of claim 12, wherein to determine the second request to be a fraudulent request, the processor is configured to:
access the database to determine the second user device ID to be the same as the first user device ID.

14. The system of claim 13, wherein the first electronic device is different from the second electronic device.

15. The system of claim 13, wherein the first electronic device is the second electronic device.

16. The system of claim 10, wherein the processor is configured to store a first encryption key and a second encryption key, and wherein the processor is further configure to:
prior to receiving the first request, receive a third request by the first electronic device;
generate the first encrypted cookie with the first encryption key;
transmit the first encrypted cookie to the first electronic device for storage; and wherein:
to re-encrypt by the server, the processor is configured to:
decrypt the first encrypted cookie using the first encryption key;
re-encrypt the decrypted first encrypted cookie with the second encrypted key, the second encrypted cookie being different from the first encrypted cookie.

\* \* \* \* \*